US011023953B1

(12) United States Patent
Furlan et al.

(10) Patent No.: US 11,023,953 B1
(45) Date of Patent: Jun. 1, 2021

(54) RECOMMENDATION ENGINE THAT INTEGRATES CUSTOMER SOCIAL REVIEW-BASED DATA TO UNDERSTAND PREFERENCES AND RECOMMEND PRODUCTS

(71) Applicant: Capital One Services, LLC, McLean, VA (US)

(72) Inventors: Elizabeth Furlan, Plano, TX (US); Chih-Hsiang Chow, Plano, TX (US); Steven Dang, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/816,008

(22) Filed: Mar. 11, 2020

(51) Int. Cl.
*G06Q 30/00* (2012.01)
*G06Q 30/06* (2012.01)
*G06Q 30/02* (2012.01)
*G06K 9/62* (2006.01)
*G06F 40/205* (2020.01)

(52) U.S. Cl.
CPC ....... *G06Q 30/0631* (2013.01); *G06F 40/205* (2020.01); *G06K 9/6223* (2013.01); *G06Q 30/0203* (2013.01); *G06Q 30/0204* (2013.01); *G06Q 30/0641* (2013.01)

(58) Field of Classification Search
None
See application file for complete search history.

(56) References Cited

U.S. PATENT DOCUMENTS

| 10,395,297 | B1 | 8/2019 | Ivie et al. |
| 2009/0319512 | A1 | 12/2009 | Baker et al. |
| 2013/0124361 | A1* | 5/2013 | Bryson ............. G06Q 30/0631 705/26.7 |
| 2014/0278990 | A1* | 9/2014 | Swanson ........... G06Q 30/0257 705/14.55 |
| 2018/0096398 | A1 | 4/2018 | Wickett |
| 2019/0180358 | A1 | 6/2019 | Nandan et al. |

\* cited by examiner

*Primary Examiner* — Mila Airapetian
(74) *Attorney, Agent, or Firm* — Sterne, Kessler, Goldstein & Fox P.L.L.C.

(57) ABSTRACT

The disclosure describes a system and methods for implementing a recommendation engine. The recommendation engine can at least generate a segmentation identifying a customer group for a product, receive a customer review from a storage location, generate a customer review profile based on the customer review, match the customer review profile to the customer group based on comparing purchase factors, preference levels, or a combination thereof associated with the segmentation and purchase factors, preference levels, or a combination thereof associated with the customer review profile, and recommend the product, one or more features of the product, or a combination thereof to a further customer based on the matched customer review profile.

20 Claims, 6 Drawing Sheets

RECOMMENDATION ENGINE THAT INTEGRATES CUSTOMER SOCIAL REVIEW-BASED DATA TO UNDERSTAND PREFERENCES AND RECOMMEND PRODUCTS

TECHNICAL FIELD

An embodiment of the present disclosure relates generally to a recommendation engine, and more particularly to a recommendation engine that integrates customer social review-based data to understand preferences and recommend products.

BACKGROUND

By understanding consumer attitudes and consumer values demonstrated in the consumer's online behavior or interactions, useful insights are drawn about consumer preferences, specifically about which products or product features the consumer prefers. These insights can be used to more accurately predict consumer product preferences without the need for consumers to initiate a search for the product or product features. Accordingly, there remains a need for improved techniques for detecting consumer attitudes and consumer values from consumer online behavior or interactions, particularly techniques without the need for human intervention.

In view of the ever-increasing commercial competitive pressures, along with growing consumer expectations and the diminishing opportunities for meaningful product differentiation in the marketplace, it is increasingly critical that solutions are found to detect consumer attitudes and consumer values from consumer online behavior or interactions without the need for human intervention. Additionally, the need to reduce costs, improve efficiencies and performance, and meet competitive pressures adds an even greater urgency to the critical necessity for finding answers to this problem.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a skilled artisan to make and use the disclosure.

DETAILED DESCRIPTION

Figure 1:
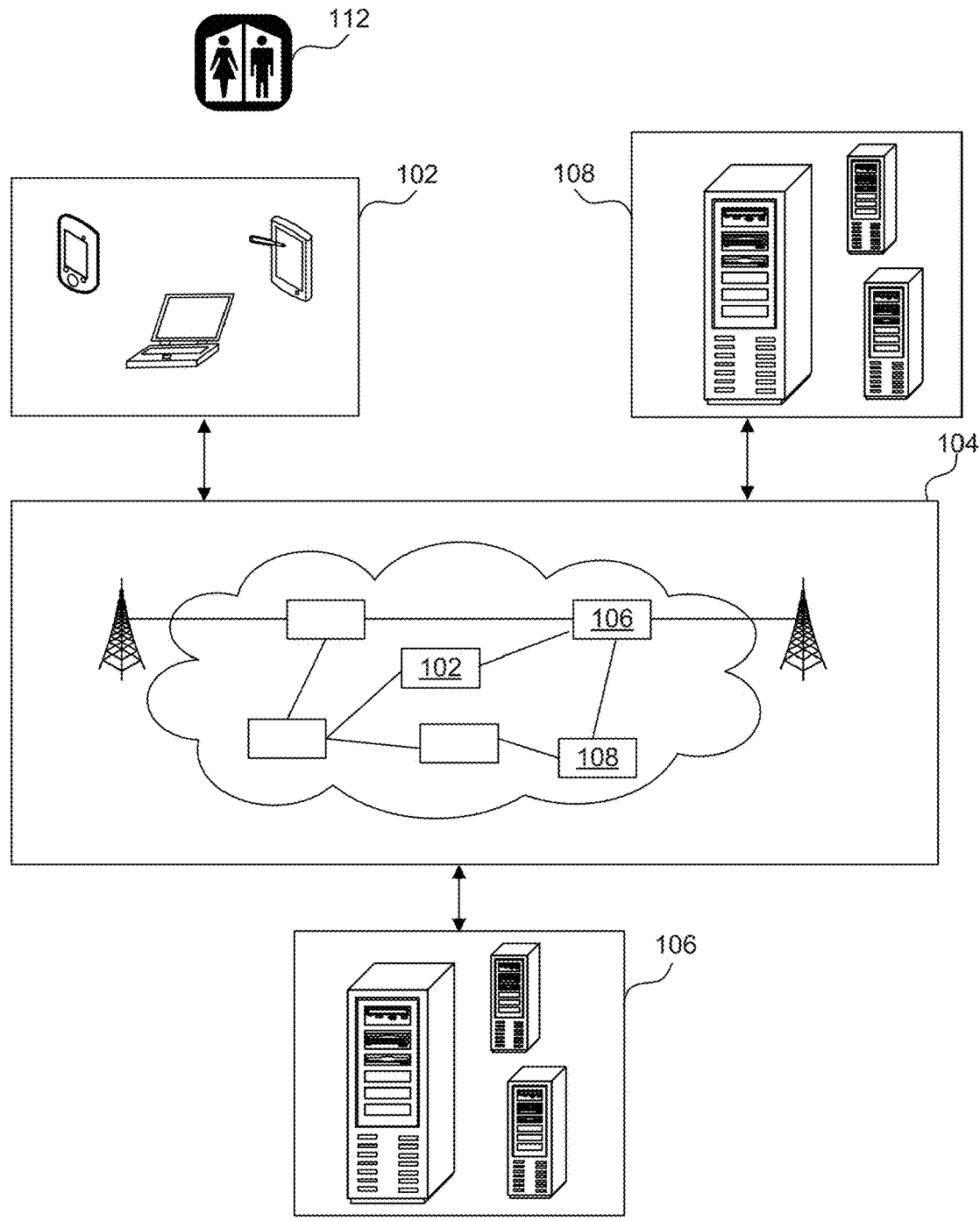
FIG. 1 is an example system in which a recommendation engine that integrates customer social review-based data to understand preferences and recommend products operates according to an embodiment.

The following embodiments are described in sufficient detail to enable a skilled artisan to make and use the present disclosure. It is to be understood that other embodiments would be evident based on the present disclosure, and that system, process, or mechanical changes may be made without departing from the scope of an embodiment of the present disclosure.

In the following description, numerous specific details are given to provide a thorough understanding of embodiments. However, it will be apparent that embodiments may be practiced without these specific details. In order to avoid obscuring an embodiment, some well-known circuits, system configurations, and process steps are not disclosed in detail.

The drawings showing embodiments are semi-diagrammatic, and not to scale. Some of the dimensions are for the clarity of presentation and are shown exaggerated in the drawings. Similarly, although the views in the drawings are for ease of description and generally show similar orientations, this depiction in the figures is arbitrary for the most part. Generally, the system can be operated in any orientation.

Certain embodiments have other steps or elements in addition to or in place of those mentioned. The steps or elements will become apparent to those skilled in the art from a reading of the following detailed description when taken with reference to the accompanying drawings.

The term "module" or "unit" referred to herein can include software, hardware, or a combination thereof in an embodiment in accordance with the context in which the term is used. For example, the software can be machine code, firmware, embedded code, or application software. Also for example, the hardware can be circuitry, a processor, a special purpose computer, an integrated circuit, integrated circuit cores, a pressure sensor, an inertial sensor, a micro-electromechanical system (MEMS), passive devices, or a combination thereof. Further, if a module or unit is written in the system or apparatus claims section below, the module or unit is deemed to include hardware circuitry for the purposes and the scope of the system or apparatus claims.

The modules and units in the following description of the embodiments can be coupled to one another as described or as shown. The coupling can be direct or indirect, without or with intervening items between coupled modules or units. The coupling can be by physical contact or by communication between modules or units.

Referring now to FIG. 1, therein is shown an example system 100 in which a recommendation engine that integrates customer social review-based data to understand preferences and recommend products operates according to an embodiment. The recommendation engine refers to a device, module, unit, or combination thereof designed to generate recommendations of products for a customer 112. The customer 112 can be any consumer of products or services who is looking purchase, or who has purchased products or services from a merchant.

The system 100 includes a first device 102, such as a client device or a server, connected to a second device 106, such as a client device or server. The first device 102 and the second device 106 can be further connected to a third device 108, such as a client device or a server. The first device 102, the second device 106, and the third device 108 can communicate with each other through a communication path 104, such as a wired or wireless network.

For example, the first device 102 can be of any of a variety of devices, such as a smart phone, a cellular phone, a personal digital assistant, a tablet computer, a notebook computer, a laptop computer, or a desktop computer. The customer 112 can use the first device 102 to communicate and interact with the second device 106, the third device 108, or a combination thereof. For example, the customer 112 can use the first device 102 to leave a review about products or services on the second device 106 or the third device 108. The first device 102 either can couple directly or indirectly to the communication path 104 to communicate with the second device 106, third device 108, or a combination thereof, or can be a stand-alone device. Stand-alone refers to a device being able to work and operate independently of the other devices.

The second device 106 and the third device 108 can be any of a variety of centralized or decentralized computing devices. For example, the second device 106 and the third device 108 can be a laptop computer, a desktop computer, grid-computing resources, a virtualized computing resource, cloud computing resources, routers, switches, peer-to-peer distributed computing devices, a server, a server farm, or a combination thereof. The second device 106 and the third device 108 can be centralized in a single room, distributed across different rooms, distributed across different geographic locations, or embedded within a telecommunications network. The second device 106 and the third device 108 can couple with the communication path 104 to communicate with the first device 102, or can be stand-alone devices.

For brevity of description in the embodiments discussed below, the first device 102 will be described as a client device, and the second device 106 and the third device 108 will be described as server devices. However, for illustrative purposes, the system 100 is shown with the first device 102 as a client device, although it is understood that the system 100 can have the first device 102 as a different type of device. For example, the first device 102 can be a server. Also for illustrative purposes, the system 100 is shown with the second device 106 and the third device 108 as servers, although it is understood that the system 100 can have the second device 106 and the third device 108 as different types of devices. For example, the second device 106 or the third device 108 can be client devices.

Also for illustrative purposes, the system 100 is shown with the first device 102, the second device 106, and the third device 108 as end points of the communication path 104, although it is understood that the system 100 can have a different partition between the first device 102, the second device 106, the third device 108, and the communication path 104. For example, the first device 102, the second device 106, the third device 108, or a combination thereof can also function as part of the communication path 104.

The communication path 104 can span and represent a variety of networks and network topologies. For example, the communication path 104 can include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Cable, Ethernet, digital subscriber line (DSL), fiber optic lines, fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
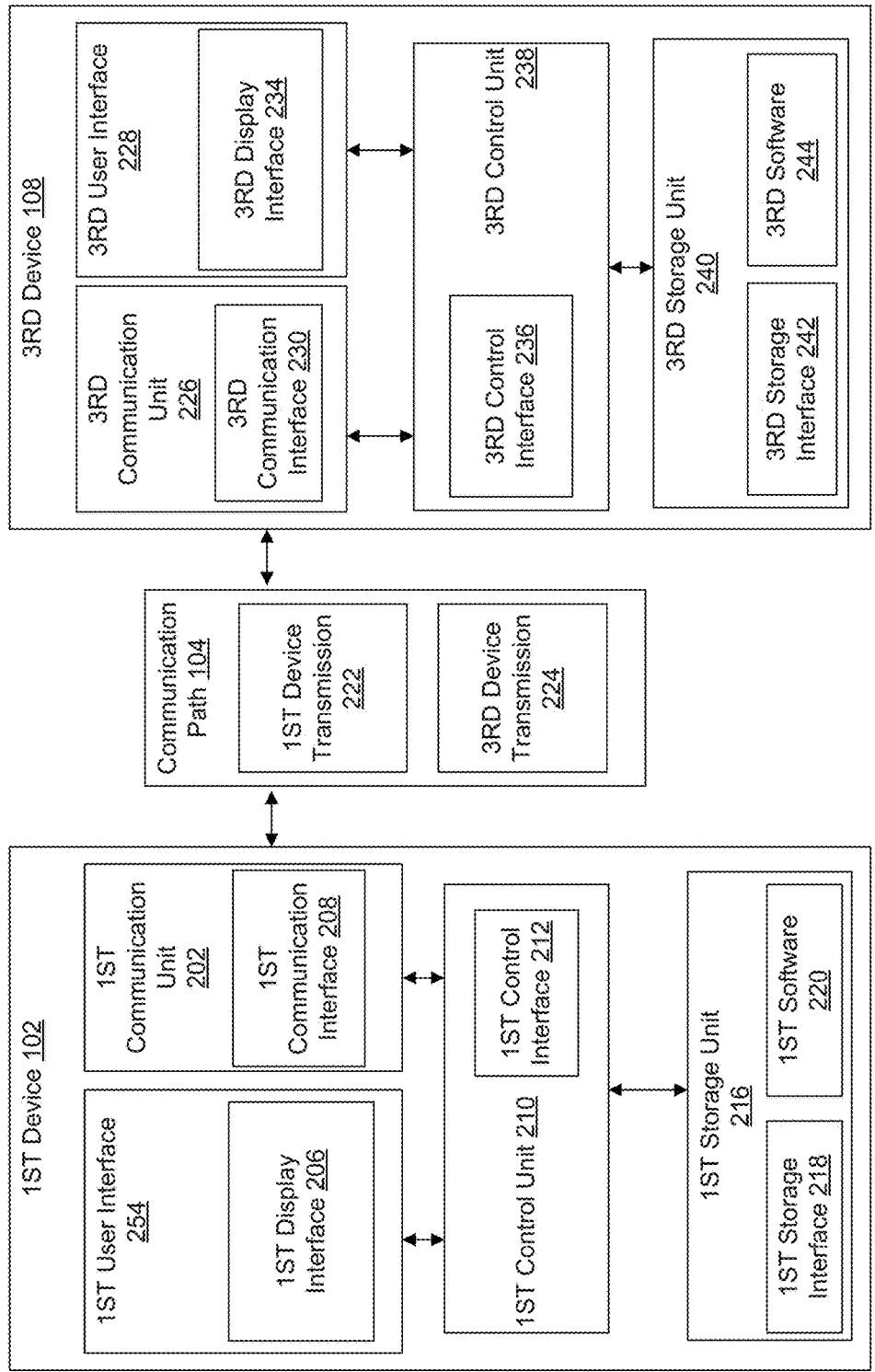
FIG. 2 is an example block diagram of the components of the system according to an embodiment.

Referring now to FIG. 2, therein is shown an example block diagram of the components of the system 100 according to an embodiment. The first device 102 can send information in a first device transmission 222 over the communication path 104 to the third device 108. The third device 108 can send information in a third device transmission 224 over the communication path 104 to the first device 102.

For illustrative purposes, the system 100 is shown with the first device 102 as a client device, although it is understood that the system 100 can have the first device 102 as a different type of device. For example, the first device 102 can be a server. Also for illustrative purposes, the system 100 is shown with the third device 108 as a server, although it is understood that the system 100 can have the third device 108 as a different type of device. For example, the third device 108 can be a client device.

For brevity of description in this embodiment of the present disclosure, the first device 102 will be described as a client device and the third device 108 will be described as a server device. Embodiments of the present disclosure are not limited to this selection for the type of devices. The selection is an example of an embodiment of the present disclosure.

The first device 102 can include a first control unit 210, a first storage unit 216, a first communication unit 202, and a first user interface 254. The first control unit 210 can include a first control interface 212. The first control unit 210 can execute a first software 220 to provide some or all of the intelligence of the system 100. The first control unit 210 can be implemented in a number of different ways. For example, the first control unit 210 can be a processor, an application specific integrated circuit (ASIC), an embedded processor, a microprocessor, a hardware control logic, a hardware finite state machine (FSM), a digital signal processor (DSP), a field programmable gate array (FPGA), or a combination thereof.

The first control interface 212 can be used for communication between the first control unit 210 and other functional units in the first device 102. The first control interface 212 can also be used for communication that is external to the first device 102. The first control interface 212 can receive information from the other functional units of the first device 102 or from external sources, or can transmit information to the other functional units of the first device 102 or to external destinations. The external sources and the external destinations refer to sources and destinations external to the first device 102. The first control interface 212 can be implemented in different ways and can include different implementations depending on which functional units or external units are being interfaced with the first control interface 212. For example, the first control interface 212 can be implemented with a pressure sensor, an inertial sensor, a microelectromechanical system (MEMS), optical circuitry, waveguides, wireless circuitry, wireline circuitry such as a bus, an application programming interface, or a combination thereof.

The first storage unit 216 can store the first software 220. For illustrative purposes, the first storage unit 216 is shown as a single element, although it is understood that the first storage unit 216 can be a distribution of storage elements. Also for illustrative purposes, the system 100 is shown with the first storage unit 216 as a single hierarchy storage system, although it is understood that the system 100 can have the first storage unit 216 in a different configuration.

For example, the first storage unit 216 can be formed with different storage technologies forming a memory hierarchal system including different levels of caching, main memory, rotating media, or off-line storage. The first storage unit 216 can be a volatile memory, a nonvolatile memory, an internal memory, an external memory, or a combination thereof. For example, the first storage unit 216 can be a nonvolatile storage such as non-volatile random access memory (NVRAM), Flash memory, disk storage, or a volatile storage such as static random access memory (SRAM) or dynamic random access memory (DRAM).

The first storage unit 216 can include a first storage interface 218. The first storage interface 218 can be used for communication between the first storage unit 216 and other functional units in the first device 102. The first storage interface 218 can also be used for communication that is external to the first device 102. The first storage interface 218 can receive information from the other functional units of the first device 102 or from external sources, or can transmit information to the other functional units or to external destinations. The first storage interface 218 can include different implementations depending on which functional units or external units are being interfaced with the first storage unit 216. The first storage interface 218 can be implemented with technologies and techniques similar to the implementation of the first control interface 212.

The first communication unit 202 can enable external communication to and from the first device 102. For example, the first communication unit 202 can permit the first device 102 to communicate with the second device 106 of FIG. 1, the third device 108, an attachment, such as a peripheral device, and the communication path 104. The first communication unit 202 can also function as a communication hub allowing the first device 102 to function as part of the communication path 104 and not be limited to be an end point or terminal unit to the communication path 104. The first communication unit 202 can include active and passive components, such as microelectronics or an antenna, for interaction with the communication path 104.

The first communication unit 202 can include a first communication interface 208. The first communication interface 208 can be used for communication between the first communication unit 202 and other functional units of the first device 102. The first communication interface 208 can receive information from the other functional units of the first device 102 or from external sources, or can transmit information to the other functional units or to external destinations. The first communication interface 208 can include different implementations depending on which functional units are being interfaced with the first communication unit 202. The first communication interface 208 can be implemented with technologies and techniques similar to the implementation of the first control interface 212.

The first communication unit 202 can couple with the communication path 104 to send information to the third device 108 in the first device transmission 222. The third device 108 can receive information in a third communication unit 226 through the communication path 104.

The first user interface 254 can present information generated by the system 100. In one embodiment, the first user interface 254 allows a user of the system 100 to interface with the first device 102. The first user interface 254 can include an input device and an output device. Examples of the input device of the first user interface 254 can include a keypad, buttons, switches, touchpads, soft-keys, a keyboard, a microphone, sensors for receiving signals, or any combination thereof to provide data and communication inputs.

Example of the output device can include a first display interface 206. The first control unit 210 can operate the first user interface 254 to present information generated by the system 100. The first control unit 210 can also execute the first software 220 to present information generated by the system 100, or to control other functional units of the system 100.

The first display interface 206 can be any graphical user interface such as a display, a projector, a video screen, or any combination thereof. The first display interface 206 allows a user of the system 100 to interact with the system 100.

The third device 108 can be optimized for implementing an embodiment of the present disclosure in a multiple device embodiment with the first device 102. In one embodiment, the third device 108 can provide additional or higher performance processing power compared to the first device 102. The third device 108 can include a third control unit 238, a third storage unit 240, a third communication unit 226, and a third user interface 228.

The third control unit 238 can include a third control interface 236. The third control unit 238 can execute a third software 244 to provide some or all of the intelligence of the system 100. The third software 244 can operate independently or in conjunction with the first software 220. In one embodiment, the third control unit 238 can provide additional performance compared to the first control unit 210. The third control unit 238 can be implemented in a number of different ways. For example, the third control unit 238 can be a processor, an application specific integrated circuit (ASIC), an embedded processor, a microprocessor, a hardware control logic, a hardware finite state machine (FSM), a digital signal processor (DSP), a field programmable gate array (FPGA), or a combination thereof.

The third control unit 238 can include a third control interface 236. The third control interface 236 can be used for communication between the third control unit 238 and other functional units of the third device 108. The third control interface 236 can also be used for communication that is external to the third device 108. The third control interface 236 can receive information from the other functional units of the third device 108 or from external sources, or can transmit information to the other functional units of the third device 108 or to external destinations. The external sources and the external destinations refer to sources and destinations external to the third device 108. The third control interface 236 can be implemented in different ways and can include different implementations depending on which functional units or external units are being interfaced with the third control interface 236. For example, the third control interface 236 can be implemented with a pressure sensor, an inertial sensor, a microelectromechanical system (MEMS), optical circuitry, waveguides, wireless circuitry, wireline circuitry such as a bus, an application programming interface, or a combination thereof.

The third storage unit 240 can store the third software 244. The third storage unit 240 can be sized to provide the additional storage capacity to supplement the first storage unit 216. For illustrative purposes, the third storage unit 240 is shown as a single element, although it is understood that the third storage unit 240 can be a distribution of storage elements. Also for illustrative purposes, the system 100 is shown with the third storage unit 240 as a single hierarchy storage system, although it is understood that the system 100 can have the third storage unit 240 in a different configuration. For example, the third storage unit 240 can be formed with different storage technologies forming a memory hierarchal system including different levels of caching, main memory, rotating media, or off-line storage. The third storage unit 240 can be a volatile memory, a nonvolatile memory, an internal memory, an external memory, or a combination thereof. For example, the third storage unit 240 can be a nonvolatile storage such as non-volatile random access memory (NVRAM), Flash memory, disk storage, or a volatile storage such as static random access memory (SRAM) or dynamic random access memory (DRAM).

The third storage unit 240 can include a third storage interface 242. The third storage interface 242 can be used for communication between the third storage unit 240 and other functional units of the third device 108. The third storage interface 242 can also be used for communication that is external to the third device 108. The third storage interface 242 can receive information from the other functional units of the third device 108 or from external sources, or can transmit information to the other functional units or to external destinations. The third storage interface 242 can include different implementations depending on which functional units or external units are being interfaced with the third storage unit 240. The third storage interface 242 can be implemented with technologies and techniques similar to the implementation of the third control interface 236.

The third communication unit 226 can enable external communication to and from the third device 108. For example, the third communication unit 226 can permit the third device 108 to communicate with the first device 102, the second device 106 of FIG. 1, an attachment, such as a peripheral device, and the communication path 104. The third communication unit 226 can also function as a communication hub allowing the third device 108 to function as part of the communication path 104 and not be limited to be an end point or terminal unit to the communication path 104. The third communication unit 226 can include active and passive components, such as microelectronics or an antenna, for interaction with the communication path 104.

The third communication unit 226 can couple with the communication path 104 to send information to the first device 102 in the third device transmission 224. The first device 102 can receive information in the first communication unit 202 through the communication path 104.

The third communication unit 226 can include a third communication interface 230. The third communication interface 230 can be used for communication between the third communication unit 226 and other functional units of the third device 108. The third communication interface 230 can receive information from the other functional units of the third device 108 or from external sources, or can transmit information to the other functional units or to external destinations. The third communication interface 230 can include different implementations depending on which functional units are being interfaced with the third communication unit 226. The third communication interface 230 can be implemented with technologies and techniques similar to the implementation of the third control interface 236.

The third user interface 228 can present information generated by the system 100. In one embodiment, the third user interface 228 allows a user of the system 100 to interface with the third device 108. The third user interface 228 can include an input device and an output device. Examples of the input device of the third user interface 228 can include a keypad, buttons, switches, touchpads, softkeys, a keyboard, a microphone, sensors for receiving signals, or any combination thereof to provide data and communication inputs. Example of the output device can include a third display interface 234. The third control unit 238 can operate the third user interface 228 to present information generated by the system 100. The third control unit 238 can also execute the third software 244 to present information generated by the system 100, or to control other functional units of the system 100.

The third display interface 234 can be any graphical user interface such as a display, a projector, a video screen, or any combination thereof. The third display interface 234 allows a user of the system 100 to interact with the system 100.

Figure 3:
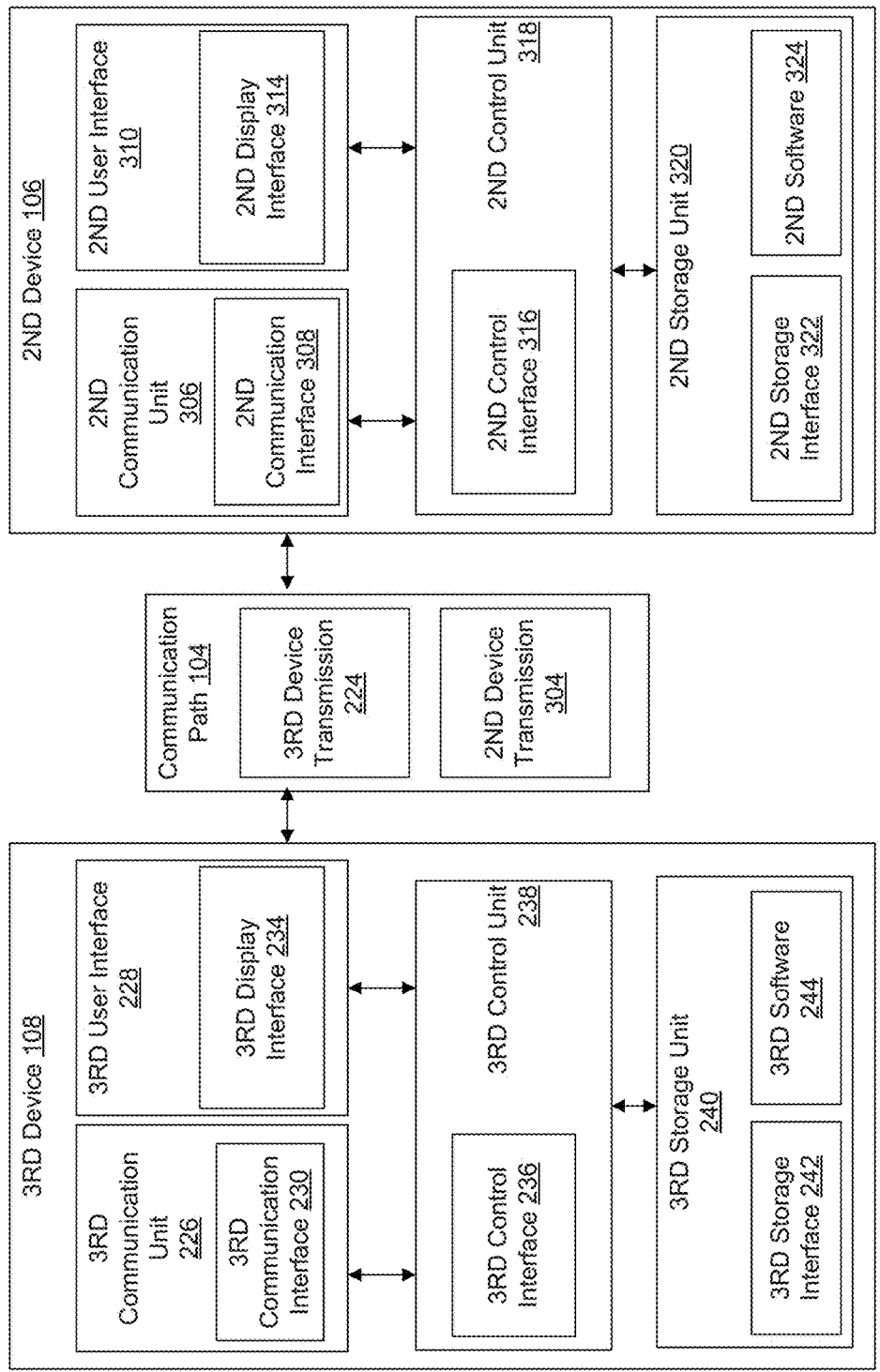
FIG. 3 is a further example block diagram of the components of the system according to an embodiment.

Referring now to FIG. 3, therein is shown a further example block diagram of the components of the system 100 according to an embodiment. The system 100 can further include the second device 106. In one embodiment, the second device 106 can be optimized for implementing an embodiment of the present disclosure in a multiple device embodiment with the first device 102 of FIGS. 1 and 2, and the third device 108. In one embodiment, the second device 106 can provide additional or higher performance processing power compared to the first device 102, the third device 108, or a combination thereof. The second device 106 can send information in a second device transmission 304 over the communication path 104 to the third device 108. While not shown, the second device 106 can also send information in the second device transmission 304 over the communication path 104 to the first device 102. The third device 108 can send information in a third device transmission 224 over the communication path 104 to the second device 106.

In one embodiment, the second device 106 can include components including a second control unit 318, a second storage unit 320, a second communication unit 306, and a second user interface 310. The components of the second device 106 can further include sub-components including a second communication interface 308, a second display interface 314, a second control interface 316, a second storage interface 322, and a second software 324. In one embodiment, the components and sub-components of the second device 106 can have the same functionality and can be implemented in the same manner as the components and sub-components of the first device 102 or the third device 108.

Some or all of the functionality of the system 100 can be provided by the first control unit 210, the third control unit 238, the second control unit 318, or a combination thereof. For illustrative purposes, the first device 102 is shown with the partition having the first user interface 254, the first storage unit 216, the first control unit 210, and the first communication unit 202, although it is understood that the first device 102 can have a different partition. For example, the first software 220 can be partitioned differently such that some or all of its functionality can be, for example, in the first control unit 210 and the first communication unit 202. Also, the first device 102 can include other functional units not shown in FIGS. 1 and 2 for clarity.

The third device 108, the second device 106, or a combination thereof can further provide some or all of the functionality of the system 100. The third device 108 and the second device 106 can have a similar or different partition as the first device 102. The functional units in each of the first device 102, the second device 106, and third device 108 can work individually and independently of the other functional units of the first device 102, the second device 106, and the third device 108. Additionally, each of the first device 102, the second device 106, and the third device 108 can work individually and independently from the other devices 102, 106, and 108, as well as the communication path 104.

For illustrative purposes, the system 100 is described by operation of the first device 102, the second device 106, and the third device 108. It is understood that the first device 102, the second device 106, and the third device 108 can operate any of the modules or units of the system 100.

Figure 4:
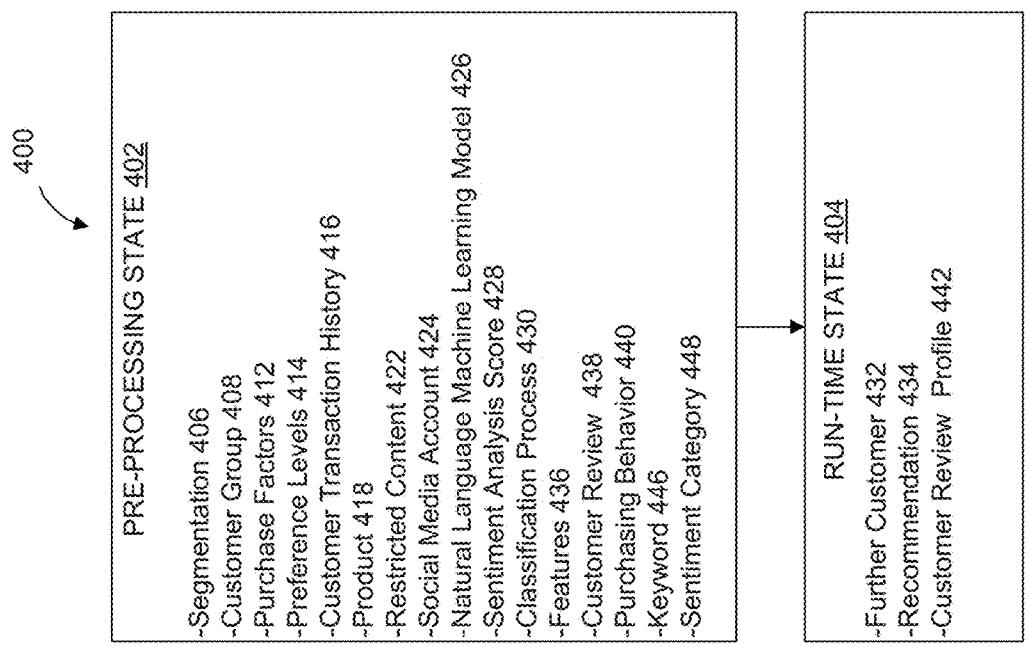
FIG. 4 is an example control flow of the operating stages of the recommendation engine according to an embodiment.

Referring now to FIG. 4, therein is shown an example control flow 400 of operating stages of the recommendation engine according to an embodiment. In one embodiment, the system 100 can operate in two stages, including a pre-processing state 402 and a run-time state 404. The embodiment shown in FIG. 4 assumes that the pre-processing state 402 is performed prior to the run-time state 404, however, this order of operation is merely exemplary and in other embodiments the pre-processing state 402 can be performed in parallel or in real-time with the run-time state 404. Real-time refers to an instance where the system 100 enables operation of the pre-processing state 402 at the same time or at the actual time when the system 100 enables operation of the run-time state 404.

The pre-processing state 402 is a mode of operation in which values, parameters, variables, data, or a combination thereof associated with the customer 112, particularly a purchasing behavior 440 of the customer 112, are identified, gathered, categorized, or generated. Purchasing behavior 440 refers to attitudes, preferences, beliefs, and decisions driving or resulting in the customer 112 decision to purchase a product 418 or service, one or more features 436 of the product 418 or service, or a combination thereof that can be represented as quantified values. Purchasing behavior 440 also refers to attitudes, preferences, beliefs, and decisions of the customer 112 with respect to the product 418 or service, features 436 of the product 418 or service, or a combination thereof after being purchased by the customer 112 that can be represented as quantified values. For the purposes of discussion in the embodiments below reference is made to the product 418 or features 436 of the product 418, however, the descriptions apply equally to a service purchased by the customer 112. Features 436 of a product 418 refers to a distinguishing characteristic of a product 418. Features 436 can be related to a product 418 appearance, components, or capabilities. Examples of features 436 include a product 418 model, size, color, version, as examples.

In one embodiment, the values, parameters, variables, data, or a combination thereof associated with the customer 112, the purchasing behavior 440, or a combination thereof can be identified, gathered, categorized, or generated based on analyzing a customer transaction history 416 of past purchases of the customer 112. The customer transaction history 416 refers to a list or record of past purchases of the customer 112. The customer transaction history 416 can include values, parameters, variables, or data associated with past purchases of the customer 112 including values, parameters, variables, or data regarding what product 418 or features 436 were purchased, from what merchant the purchase was made, location of the purchase, date and time of the purchase, transaction amount in monetary terms of the purchase (for example how many dollars, euros, yen, yuan, etc. were spent), or a combination thereof. In one embodiment, the customer transaction history 416 can further include product 418 or features 436 specific values, parameters, variables, or data, including a product model number, a stock keeping unit (SKU) code, or a combination thereof as examples.

In one embodiment, the customer transaction history 416 can be generated or implemented as an electronic record, electronic document, or a combination thereof, such as, for example, a pdf document, a Microsoft Excel™ spreadsheet, a text file, or entries in a database. In one embodiment, the customer transaction history 416 can be generated or implemented by any of the components of the system 100, for example any of the devices or components of FIGS. 1, 2, and 3. In another embodiment, the customer transaction history 416 can be generated or implemented by a third party computer system, and retrieved by the system 100 via the communication path 104 for processing and analysis by the components of the system 100. In one embodiment, the customer transaction history 416 can be stored in the first storage unit 216, the second storage unit 320, the third storage unit 240, or a combination thereof. In another embodiment, the customer transaction history 416 can be stored on a third party storage device, similar to the first, second, or third storage units 216, 320, and 240, but separate from the first, second, and third storage units 216, 320, and 240, and can be retrieved by the devices or components of the system 100 from the third party storage via the communication path 104 for processing and analysis by the components of the system 100.

In one embodiment, the values, parameters, variables, or data, obtained from the customer transaction history 416 can be used by the system 100 as a search parameter to further search publicly available sources on the Internet, such as review sites, blogs, websites, or a social media account 424 to determine what the customer 112 has said about the product 418, features 436, or a combination thereof in, for example, a customer review 438. As a result, the system 100 can determine an attitude of the customer 112 towards the product 418, features 436, or a combination thereof, and can further determine what factors influence the customer 112 to purchase the product 418, features 436, or a combination thereof. In one embodiment, the system 100 can quantify the factors, which can in combination indicate the purchasing behavior 440 of the customer 112. How the system 100 determines the attitude of the customer 112 and purchasing behavior 440 will be discussed further below.

In some cases, information needed to determine the purchasing behavior 440 can be restricted and not readily accessible via searching publicly available sources on the Internet or a social media account 424. In such cases, access to the information can require further authentication, such as through a user name and password, that needs to be provided to the system 100. In one embodiment, the customer 112 can provide the system 100 access to a restricted content 422 by, for example, providing the system 100 a user name and a password that the system 100 can use to access the restricted content 422. Restricted content 422 refers to information that can only be accessed through authentication, such as through a user name or password, and is not available to the public absent the authentication. An example of restricted content 422 can be information on a social media account 424 associated with the customer 112 that can only be accessed with a user name and password. In one embodiment, if given access to the restricted content 422, the system 100 can further search the restricted content 422 in order to gather and analyze information related to reviews, comments, or feedback provided by the customer 112 about the product 418, features 436, or a combination thereof to determine the purchasing behavior 440.

By way of example, in one embodiment, the system 100 can, for example, access the restricted content 422 on a social media account 424 by using a user name and password provided by the customer 112. Once accessed, the system 100 can search or crawl the feeds, webpages, linked pages, subscribed pages, text, images, or metadata comprising the restricted content 422, and gather and retrieve information indicating the purchasing behavior 440. For example, in one embodiment, the system 100 can search for a customer review 438 generated by the customer 112 about the product 418, features 436, or a combination thereof. The customer review 438 refers to an evaluation or commentary about the product 418, features 436, or a combination thereof by the customer 112. In one embodiment, the customer review 438 can further include commentary about a company or an industry. For example, the commentary about a company or an industry can indicate how favorable or unfavorable the customer 112 views the company or industry. The customer review 438 can indicate the customer 112 preferences, attitudes, likes, and dislikes about the product 418, features 436, a company or an industry, or a combination thereof. Using the information the system 100 can determine the purchasing behavior 440.

In one embodiment, the system 100 can perform the search of the publicly available source, the social media account 424, the restricted content 422, or a combination thereof for the customer review 438 by, for example, searching for, retrieving, and analyzing a text, images, or a combination thereof on the publicly available source, the social media account 424, or the restricted content 422. For example, the system 100 can parse text, images, or a combination thereof to determine whether a customer review 438 exists. In one embodiment, if the system 100 determines that the customer review 438 exists, the system 100 can further analyze the text of the customer review 438 to extract a keyword 446 to determine the purchasing behavior 440. A keyword 446 can be any word relevant to determining the purchasing behavior 440. For example, the keyword 446 can include a legal name associated with the customer 112, an identification number associated with the customer 112, a fictitious name associated with the customer 112, words identifying the product 418 or features 436, words indicating a reaction or sentiment of the customer 112, words indicating a degree of preference, or a combination thereof.

For example, in one embodiment, the system 100 can search for a keyword 446 such as "REVIEW," "CUSTOMER REVIEW," "FEEDBACK," as examples, which can indicate the existence of a customer review 438. In one embodiment, the system 100 can further search for a keyword 446 related to the product 418 brand, model number, a user name associated with the customer 112, or a combination thereof, as examples, and use the keyword 446 by itself or in combination with other keywords to identify or associate the customer 112, the product 418, or features 436 to the customer review 438. In one embodiment, in addition to searching publicly available sources, social media accounts 424, or restricted content 422 for a customer review 438, the system 100 can further receive via an application programming interface (API) a text with the customer review 438 directly from a third party source. In one embodiment, the system 100 can further search the text received and search for a keyword 446 in the same manner described above to determine the purchasing behavior 440.

In one embodiment, the system 100, in the pre-processing state 402, can, based on identifying the customer review 438 and a keyword 446, further generate a model, parameters, values, or data representing one or more purchase factors 412, one or more preference levels 414 associated with the purchase factors 412, or a combination thereof indicating what factors or influences are contributing to the purchasing behavior 440. The purchase factors 412, the preference levels 414, or a combination thereof can alone or in combination indicate what factors or influences are contributing to the purchasing behavior 440. The purchase factors 412 and the preference levels 414 will be discussed further below.

In one embodiment, the system 100 can further generate a model, parameters, values, or data representing a reaction, a sentiment, or a combination thereof of the customer 112 towards the product 418, features 436, or a combination thereof based on the customer review 438 and a keyword 446. The model, parameters, values or data representing the reaction, the sentiment, or a combination thereof can indicate the degree to which the customer 112 views the product 418, features 436, or a combination thereof favorably or unfavorably. In one embodiment, the model, parameters, values, or data representing the reaction, sentiment, or a combination thereof can be represented as a sentiment analysis score 428. The sentiment analysis score 428 can be a quantified numerical value representing how favorably or unfavorably the customer 112 views the product 418, features 436, or a combination thereof. The sentiment analysis score 428 can further indicate what factors or influences are contributing to the purchasing behavior 440.

In one embodiment, the sentiment analysis score 428 can be a value in a numerical range, for example a value from "1" to "0," representing how favorable or unfavorable the customer 112 feels about the product 418, features 436, or a combination thereof based on the text, images, or a combination thereof of the customer review 438. In another embodiment, the sentiment analysis score 428 can be a binary value, for example "1" or "0" representing how favorably or unfavorably the customer 112 feels about the product 418, features 436, or a combination thereof. For example, in one embodiment the value of "1" can represent the most favorable sentiment while the value of "0" can represent the least favorable sentiment.

In one embodiment, the system 100 can generate the purchase factors 412, the preference levels 414, the sentiment analysis score 428, or a combination thereof using a natural language machine learning model 426. The natural language machine-learning model 426 refers to a computer model with the ability to understand, analyze, and manipulate human language. The natural language machine-learning model 426 can be implemented using a variety of machine learning models and processes including, Support Vector Machine, Naïve Bayes, Convolutional Neural Networks models, in addition to classification models, such as Bag of Words, Logistic Regression, or Doc2Vec models. In one embodiment, the natural language machine learning model 426 can generate the purchase factors 412, the preference levels 414, the sentiment analysis score 428 based on searching for and finding a keyword 446 in the text, image, or a combination thereof of the publicly available source, the social media account 424, the restricted content 422, the customer review 438, or a combination thereof.

The natural language machine learning model 426 can generate the sentiment analysis score 428 through a variety of methods and techniques. For example, the sentiment analysis score 428 can be generated through knowledge-based techniques, statistical methods, or hybrid methods. Knowledge-based techniques refers to lexicon-based techniques that utilize domain knowledge and the semantic and syntactic characteristics of language in order to detect certain emotion types. Examples of knowledge-based techniques include classification of a keyword 446 based on classification models such as WordNet, SenticNet, ConceptNet, EmotiNet, and Bag of Words as examples. Statistical methods refers to methods in which a large set of annotated data is processed such that the natural language machine learning model 426 learns and predicts the appropriate emotion types. Examples of statistical methods include Support Vector Machines, Naïve Bayes, Maximum Entropy, Convolutional Neural Networks, Long Short-term Memory, and Extreme Learning Machine models as examples. Hybrid methods refers to a combination of knowledge-based techniques and statistical methods.

By way of example, in one embodiment, if the sentiment analysis score 428 is determined through a knowledge-based technique, the system 100 can search for a keyword 446 within a text of the customer review 438 and perform a counting, a numerical analysis, or a combination thereof based on the number of times or instances the keyword 446 is used. As a result, the system 100 can determine a reaction, sentiment, or attitude based on the frequency of use of the keyword 446. For example, in one embodiment, the natural language machine-learning model 426 can have pre-programmed, certain keywords associated with known reactions, sentiments, or attitudes, which can be represented as one or more sentiment categories 448. In one embodiment, the sentiment categories 448 can be for example, "VERY POSITIVE," "POSITIVE," "NEUTRAL," "NEGATIVE," or "VERY NEGATIVE," as examples. For example, in one embodiment, the keyword 446 "BAD," "TERRIBLE," "HORRIBLE," can be associated with the sentiment categories 448 of "NEGATIVE" or "VERY NEGATIVE" while the keyword 446 "GOOD," "GREAT," "WONDERFUL," can be associated with the sentiment categories 448 of "VERY POSITIVE" or "POSITIVE." In one embodiment, depending on the number of times or instances the keyword 446 is used, the natural language machine learning model 426 can perform a count and determine how positive or negative the customer review 438 is based on the number of times the keyword 446 is encountered in the customer review 438. For example, if the word "GOOD" is used multiple times while the word "BAD" is not used or used less than the number of times the word "GOOD" is used, the natural language machine learning model 426 can determine that the overall reaction, sentiment, or attitude of the customer review 438 is positive. In another embodiment, the system 100 can determine the overall reaction, sentiment, or attitude based on a threshold value, above or below which the customer review 438 is determined to be positive or negative. For example, if a keyword 446 associated with a positive sentiment is used a number of times above a threshold value, for example twice the number of times as a keyword 446 associated with a negative sentiment, the natural language machine learning model 426 can determine that the customer review 438 is "VERY POSITIVE." In one embodiment, based on the determination, the sentiment analysis score 428 can be determined or assigned. For example, if the sentiment is determined to be "VERY POSITIVE," the sentiment analysis score 428 can be "1," while if the sentiment is determined to be "VERY NEGATIVE" the sentiment analysis score 428 can be "0." The aforementioned is merely an example of one way to determine the sentiment analysis score 428 and not meant to be limiting. Other methods and techniques can be used.

The purchase factors 412 refer to influences, characteristics, or categories that cause the customer 112 to purchase the product 418, features 436, or a combination thereof. For example, the purchase factors 412 can include categorizations represented as values, data, data structures, or a combination thereof of characteristics or categories describing the product 418, features 436, or a combination thereof. Examples of purchase factors 412 are values, data, data structures, or a combination thereof representing the characteristics or categories of quality, price, style, availability, as examples. In one embodiment, the natural language machine-learning model 426 can determine the purchase factors 412 based on parsing the text of the customer review 438 to find a keyword 446. Based on identifying the keyword 446, the natural language machine-learning model 426 can determine what purchase factors 412 are contributing to the purchasing behavior 440.

By way of example, in one embodiment, the keyword 446 "QUALITY," "EXCELLENT QUALITY," "BAD QUALITY," "GOOD QUALITY," "POORLY MADE," or "STURDY," can be associated with the purchase factor 412 of "quality." Thus, when the aforementioned words or word are identified by the natural language machine learning model 426, the system 100 will know that the purchase factor 412 of "quality" was contributing to the purchasing behavior 440. In another example, the keyword 446 "STYLE," "STYLISH," "FASHIONABLE," "CHIC," or "TRENDY," for example, can be associated with the purchase factor 412 of "style." Thus, when identified, the system 100 will know that "style" is contributing to the purchasing behavior 440. The aforementioned are merely examples and not meant to be limiting. These and other keywords can be associated with other purchase factors 412 other than those mentioned.

The preference levels 414 refer to a degree to which the purchase factors 412 are determined to be important to the customer 112. The preference levels 414 can be represented as values, data, data structures, or a combination thereof representing a degree of importance. For example, in one embodiment, the preference levels 414 can be represented by a value in a continuous numerical range from, for example "1" to "0" representing a degree of importance where "1 is the most important while "0" represents the least important for each of the purchase factors 412. For example, in one embodiment, if the preference levels 414 are values that increment by values of "0.5," on a scale from "0" to "1," "0" can represent no importance, negative importance, or low importance, "0.5" can represent neutral importance, and "1" can represent high importance for each of the purchase factors 412.

In one embodiment, similar to how the purchase factors 412 are determined, the preference levels 414 can be determined based on the natural language machine-learning model 426 identifying a keyword 446 indicating the degree of importance. For example, in one embodiment, the keyword 446 "VERY," "HIGH," "VERY HIGH," or "EXTREMELY HIGH," can be associated with a "high" or greater degree of importance, whereas the keyword 446 "LOW," "EXTREMELY LOW," "NOT VERY," or "NOT PARTICULARLY" can be associated with a "low" or less degree of importance, such that whenever the natural language machine learning model 426 encounters the keyword 446 while parsing the text, images, or a combination thereof of the customer review 438, the natural language machine learning model 426 can update or generate a list, a variable, a data, a data structure, or a combination thereof tracking the preference levels 414 for each of the purchase factors 412 and know, based on the count of the keyword 446, how important the purchase factor 412 is to the customer 112.

By way of example, if the natural language machine learning model 426 encounters the sentence "THE PRODUCT IS VERY GOOD QUALITY," the natural language machine learning model 426 can determine that "quality" is one of the purchase factors 412 contributing to the purchasing behavior 440, and that "quality" should be accorded a high degree of importance due to the words "VERY GOOD" describing the "quality." Similarly, if the sentence "THE PRODUCT HAS GOOD QUALITY DESPITE THE HIGH PRICE" is encountered, the natural language machine-learning model 426 can determine that "quality" and "price" are contributing to the purchasing behavior 440, and that "quality" should be given higher importance than "price" because the customer 112 is placing higher preference for quality over price. The aforementioned are presented by way of example to illustrate how the system 100 can operate and is not meant to be limiting. Further combinations of keywords can be used to determine the preference levels 414.

Continuing with the example, in one embodiment, during the pre-processing state 402, the purchase factors 412, the preference levels 414, the sentiment analysis score 428, or a combination thereof can further be used in addition to information, parameters, variables, or data, obtained from the customer transaction history 416 to generate a segmentation 406 identifying a customer group 408 for the product 418, features 436, or a combination thereof. The segmentation 406 refers to the division of the customers into groups based on common characteristics. A customer group 408 is defined to the group of customers with the common characteristics. In one embodiment, a segmentation 406 can be generated for a product 418, features 436, or a combination thereof.

The segmentation 406 can be generated in a variety of ways and through a variety of techniques. In one embodiment, the segmentation 406 can be generated based on combining the purchase factors 412, the preference levels 414, and the sentiment analysis score 428 into a vector or data structure, and further generating a cluster, classification, or grouping based on the vector or data structure. The clustering, classification, or grouping can be done via a classification process 430. The classification process 430 refers to any method or technique that can be used to group data. For example, the classification process 430 can be implemented using a K-Means Clustering, Mean-Shift Clustering, Density-Based Spatial Clustering of Applications with Noise, Expectation-Maximization Clustering using Gaussian Mixture Models, Agglomerative Hierarchical Clustering, or other techniques used to group data. For example, in one embodiment, the vector or data structure representing the purchase factors 412, the preference levels 414, the sentiment analysis score 428, or a combination thereof can be put through a K-Means Clustering process such that the result is a data point representing the vector or data structure that is mapped to an N-dimensional space, where N represents an integer.

In one embodiment, once generated, the segmentation 406 can further be used in the run-time state 404 to generate a recommendation 434 to a further customer 432. The recommendation 434 refers to a suggestion to a further customer 432 whether or not to purchase the product 418, features 436, or a combination thereof. To make the recommendation 434, the system 100, in the run-time state 404, determines the purchasing behavior 440 of the further customer 432 and based on the same the system 100 can determine what customer group 408 of the segmentation 406 the further customer 432 correlates to or is most like. The purchasing behavior 440 of the further customer 432 can be determined in the same way that the purchasing behavior 440 of the customer 112 is done. For example, the system 100 can search publicly available sources on the Internet, such as review sites, blogs, websites, or a social media account 424, or a restricted content 422 on the same, for a customer review 438 of the further customer 432 to determine the further customer's 432 attitudes towards the product 418, features 436, a company or industry, or further products, or a combination thereof and determine one or more purchase factors 412, one or more preference levels 414, a sentiment analysis score 428, or a combination thereof associated with the further customer 432. How the recommendation 434 is generated will be discussed further below.

The system 100 can implement the pre-processing state 402 using the various functional units of FIGS. 1, 2 and 3 of the system 100, one or more external components to the system 100, or a combination thereof. External components refer to components external to the system 100.

The run-time state 404 is a mode of operation in which the system 100 can use the segmentation 406 and a customer group 408 generated during the pre-processing state 402, to make the recommendation 434 to the further customer 432. In one embodiment, the run-time state 404 can identify, gather, categorize, or generate values, parameters, variables, data, or a combination thereof about the further customer 432 in a similar process and using similar techniques as was described with respect to the customer 112 in the pre-processing state 402. For example, in one embodiment, the system 100 can use a customer transaction history 416, a publicly available source, or a social media account 424 associated with the further customer 432 to identify a customer review 438 of the further customer 432, and to determine the purchasing behavior 440 of the further customer 432. In one embodiment, the system 100 can further use one or more modules implementing the natural language machine learning model 426, and the classification process 430 to analyze a text or images, from for example the customer review 438 to determine the purchasing behavior 440 of the further customer 432, and further map the further customer 432 to a customer group 408 as determined in the pre-processing state 402. In one embodiment, based on the mapping the system 100 can make the recommendation 434 as to whether or not to purchase the product 418, features 436, or a combination thereof to the further customer 432.

In one embodiment, in order to make the recommendation 434, the system 100, during the run-time state 404, can generate a customer review profile 442 to store the quantified values representing the further customer's 432 purchasing behavior 440. The customer review profile 442 refers to a vector or a data structure that can store values generated by the system 100 indicating the further customer's 432 purchasing behavior 440. In one embodiment, the customer review profile 442 can include a sentiment analysis score 428, purchase factors 412, preference levels 414, or a combination thereof associated with the further customer 432. How the customer review profile 442 is generated will be discussed further below.

In one embodiment, once the customer review profile 442 is generated, the system 100 can use a similar classification process 430 as was described with respect to the pre-processing state 402 to map the customer review profile 442 to a customer group 408 determined during the pre-processing state 402 based on the segmentation 406. By way of example, the mapping can be performed by, for example, putting the customer review profile 442 through the classification process 430, for example a K-Means Clustering process, such that it is mapped to a data point in an N-dimensional space, where N represents an integer. The data point generated can then be compared to the data points of the segmentation 406. Based on where the data point lies as compared to the data points of the segmentation 406, the system 100 can determine what customer group 408 the data point representing the customer review profile 442 should be associated with or is most like. Based on what customer group 408 the data point is associated with, the system 100 can determine whether or not to make the recommendation 434 to the further customer 432. If for example the data point is associated with a customer group 408 that is determined to be likely to want the product 418, features 436, or a combination thereof the system 100 can make the recommendation 434 to purchase the product 418, features 436, or a combination thereof, while if the data point is associated with a customer group 408 that is determined to not want the product 418, features 436, or a combination thereof the system 100 can make the recommendation 434 to not purchase the product 418, features 436, or a combination thereof.

The system 100 can implement the run-time state 404 using the various functional units of FIGS. 1, 2 and 3 of the system 100, one or more external components to the system 100, or a combination thereof. External components refer to components external to the system 100.

The pre-processing state 402 and the run-time state 404 can further be implemented based on executing the first software 220 of FIG. 2, the second software 324 of FIG. 3, the third software 244 of FIGS. 2 and 3, or a combination thereof, or a set of instructions stored in the first storage unit 216 of FIG. 2, the second storage unit 320 of FIG. 3, the third storage unit 240 of FIGS. 2 and 3, or a combination thereof, which can be executed by the first control unit 210 of FIG. 2, the second control unit 318 of FIG. 3, the third control unit 238 of FIGS. 2 and 3, or a combination thereof. In one embodiment, the pre-processing state 402 and the run-time state 404 can further be implemented using other functional units of the system 100 in addition to using the aforementioned functional units.

Figure 5:
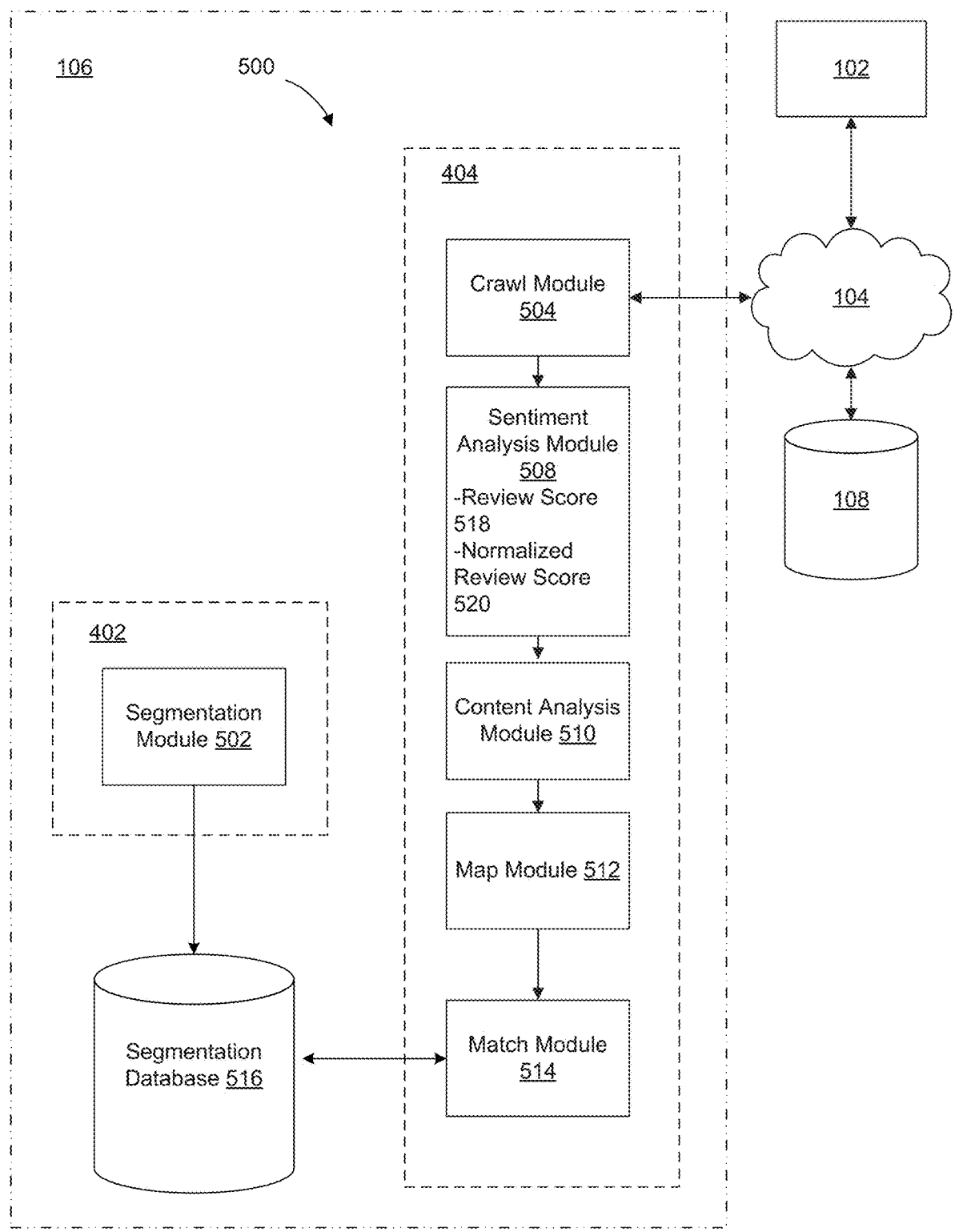
FIG. 5 is a further example control flow of the recommendation engine according to an embodiment.

Referring now to FIG. 5, therein is shown a further example control flow 500 of the recommendation engine according to an embodiment. FIG. 5 shows the control flow 500 with respect to the operation of the pre-processing state 402 and the run-time state 404. In one embodiment, the pre-processing state 402 and the run-time state 404 can be implemented with modules and sub-modules. FIG. 5 shows the modules and sub-modules as being operated, stored on, and executed by the second device 106. This is merely exemplary and done for ease of description. In other embodiments, the modules and sub-modules can be executed by the other devices such as the first device 102, the third device 108, or a combination thereof.

In one embodiment, the pre-processing state 402 can include a segmentation module 502. In one embodiment, the run-time state 404 can include a crawl module 504, a sentiment analysis module 508, a content analysis module 510, a map module 512, and a match module 514. In one embodiment, the crawl module 504 can couple to the sentiment analysis module 508. The sentiment analysis module 508 can couple to the content analysis module 510. The content analysis module 510 can couple to the map module 512. The map module 512 can couple to the match module 514.

The segmentation module 502 can enable generating the segmentation 406 identifying the customer group 408 as described with respect to FIG. 4 as part of the pre-processing state 402. In one embodiment, the segmentation module 502 can enable generating the segmentation 406 using the methods and techniques described with respect to the pre-processing state 402 of FIG. 4. For the purposes of discussion with respect to this FIG. 5, it is assumed that the values, parameters, variables, data, or a combination thereof needed to generate the purchase factors 412, the preference levels 414, the sentiment analysis score 428, or any other values, parameters, variables, or data needed in intermediary steps needed to determine the purchasing behavior 440 of the customer 112 has already been determined such that a vector containing the purchase factors 412, the preference levels 414, and the sentiment analysis score 428 has been generated, as described with respect to FIG. 4, and obtained by the segmentation module 502.

In one embodiment, once the segmentation module 502 obtains the vector, the segmentation module 502 can perform the classification process 430 as described with respect to FIG. 4 to obtain the segmentation 406 and identify the customer group 408 based on the same. In one embodiment, once the segmentation 406 identifying the customer group 408 is generated, the segmentation module 502 can store the segmentation 406 in a segmentation database 516. The segmentation database 516 refers to a database, a repository, a list, a table, or a combination thereof that stores the segmentation 406. In one embodiment, the segmentation database 516 can be part of the system 100 and stored on or implemented on the devices of the system 100, for example the second device 106. In other embodiments, the segmentation database 516 can be external to the system 100.

If part of the system 100, for example, on the second device 106, the segmentation database 516 can be part of the second storage unit 320. If external to the system 100, the segmentation database 516, can be implemented in a similar way as the first, second, or third storage units 216, 320, and 240. For example, the segmentation database 516 can be implemented with a volatile memory, a nonvolatile memory, an internal memory, an external memory, or a combination thereof. For example, segmentation database 516 can be implemented using a nonvolatile storage such as non-volatile random access memory (NVRAM), Flash memory, disk storage, or a volatile storage such as static random access memory (SRAM) or dynamic random access memory (DRAM). In one embodiment, the segmentation database 516 can further be implemented as a database, a repository, a list, a table, or a combination thereof using software, hardware, or a combination thereof using the above mentioned memory components.

Continuing with the example, in one embodiment, once the segmentation module 502 stores the segmentation 406 on the segmentation database 516, the system 100 can use the segmentation 406 during the run-time state 404 to make the recommendation 434 to the further customer 432 as described with respect to FIG. 4.

In one embodiment, the crawl module 504 can begin the process of the run-time state 404. The crawl module 504 can enable the search for, identification of, and receipt of values, parameters, variables, data, or a combination thereof about the further customer 432, specifically about the purchasing behavior 440 of the further customer 432. The crawl module 504 can do so in a similar manner and using similar processes and techniques as described with respect to how the system 100 determines the purchasing behavior 440 of the customer 112 during the pre-processing state 402 as described with respect to FIG. 4. For example, in one embodiment, the crawl module 504 can search for, identify, and receive a customer transaction history 416 to determine the purchasing behavior 440 of the further customer 432. For example, in one embodiment, the crawl module 504 can search for a customer transaction history 416 of the further customer 432 to determine what products or services the further customer 432 has purchased.

In one embodiment, the crawl module 504 can use the customer transaction history 416 of the further customer 432 to further search for, identify, and receive from a publicly available source, such as the Internet, a social media account 424, or a combination thereof, via the communication path 104, further information such that the system 100 can determine the purchasing behavior 440 of the further customer 432. For example, in one embodiment, the crawl module 504 can search for, identify, and receive a customer review 438 associated with or written by the further customer 432 about the product 418, features 436, a further product with similar characteristics to the product 418, features 436, or about any other products or services the further customer 432 has purchased. In one embodiment, the crawl module 504 can further parse the text, images, or a combination thereof of the customer review 438 in a similar way as was described with respect to FIG. 4, for example based on a keyword 446 to determine the purchasing behavior 440 of the further customer 432.

In one embodiment, the crawl module 504 can further access a restricted content 422 associated with the further customer 432. Similar to the process described with respect to FIG. 4, the crawl module 504 can, in one embodiment, use a user name and password obtained from the further customer 432, which the crawl module 405 can use to access the restricted content 422 to obtain text, data, images, or information, to allow the system 100 to determine the purchasing behavior 440 of the further customer 432.

In one embodiment, the customer review 438 of the further customer 432 received by the crawl module 504 can further be used to generate the customer review profile 442 described with respect to FIG. 4. The customer review profile 442 can be determined based on techniques and processes executed or implemented in subsequent steps of the control flow 500, for example through processes and techniques executed or implemented by the sentiment analysis module 508 and the content analysis module 510. In one embodiment, once the crawl module 504 performs its operations and receives the customer review 438 associated with the further customer 432, the crawl module 504 can pass control and the customer review 438 to the sentiment analysis module 508.

The sentiment analysis module 508 enables the generation of a model, parameters, values, or data representing a reaction, a sentiment, or a combination thereof of the further customer 432 towards the product 418, features 436, a further product, or a combination thereof based on the customer review 438 of the further customer 432 to determine the purchasing behavior 440 of the further customer 432. The sentiment analysis module 508 can enable the generation of the model, parameters, values, or data representing a reaction, a sentiment, or a combination thereof in a similar manner and using the same techniques as described with respect to FIG. 4.

In one embodiment, the sentiment analysis module 508 can enable the generation of a normalized review score 520 based on the customer review 438 of the further customer 432. In one embodiment, the normalized review score 520 can be used to generate the sentiment analysis score 428 associated with the customer review 438 of the further customer 432. The normalized review score 520 refers to a value on a standard scale or baseline that can be used by the system 100 to generate a sentiment analysis score 428. The normalized review score 520 can allow the system 100 to generate the sentiment analysis score 428 by converting a review score 518 associated with a customer review 438 to a standardized and common scale or baseline, from which the sentiment analysis score 428 can be generated.

By way of example, if the customer review 438 has associated with it a review score 518, the sentiment analysis module 508 can convert that review score 518 to the normalized review score 520. The review score 518 refers to a value, text, or image indicating a sentiment, reaction, or a combination thereof. The review score 518 can be in the form of a number, character, image, emoji, or a combination thereof. If a review score 518 exists for a customer review 438, the sentiment analysis module 508 can generate the normalized review score 520 by performing a conversion of the review score 418 to the normalized review score 520. For example, if the review score 518 is an image or emoji indicating a sentiment based on images of "stars" wherein 1 star indicates a low/unfavorable sentiment or rating while 5 stars indicates a high/favorable sentiment or rating for the product 413, features 436, the further product, or a combination thereof, the sentiment analysis module 508 can convert or rescale the "star" ratings to the normalized review score 520, associated with the "star" rating. In another embodiment, if the review score 518 is based on a "thumbs up" or "thumbs down" rating system indicating how favorable or unfavorable the further customer 432 views the product 413, features 436, a further product, or a combination thereof, the sentiment analysis module 508 can convert or rescale the "thumbs up" and "thumbs down" rating to the normalized review score 520, associated with the "thumbs up" or "thumbs down" rating.

In one embodiment, the normalized review score 520 can be a numerical value, a categorization, or a combination thereof. For example, in one embodiment, if the normalized review score 520 is represented as a numerical value it can be a value in a range or on a scale, for example from "1" to "5" indicating how favorable or unfavorable the customer review 438 of the further customer 432 is.

The normalized review score 520 can be determined in a variety of ways and through a variety of techniques. For example, in one embodiment, the normalized review score 520 can be determined through a conversion process wherein the review score 518 can be mapped to a different scale. For example, in one embodiment the system 100 can have a table, list, database with predetermined conversions between one or more review score 518 types or rating systems, wherein the review score 518 types can be mapped to a numerical value representing the normalized review score 520. For example, in one embodiment, a "thumbs up" or "thumbs down" review score 518 can be converted to values ranging from "1" to "5." For example, in embodiment, a "thumbs up" can convert to a normalized review score 520 of "5" indicating a positive/favorable rating. Alternatively, a "thumbs down" can convert to a normalized review score 520 of "1," indicating a negative/unfavorable rating.

In another embodiment, the normalized review score 520 can be determined through a statistical analysis, for example by aggregating or averaging over a threshold number of customer reviews 438 the review scores 518 which can then be used determine the normalized review score 520. This technique assumes multiple review scores 518 exist such that they can be aggregated. For example, in one embodiment, if the further customer 432 has left 10 reviews, each with a review score 518 on a "thumbs up" or "thumbs down" scale, the sentiment analysis module 508 can determine the number of "thumbs up" vs "thumbs down" ratings and determine a percentage by for example dividing the number of "thumbs up" or "thumbs down" ratings by the total number of review scores. Based on the percentage the system 100 can determine an overall review score 518. For example, if 60% of the ratings were "thumbs up" and 40% were "thumbs down," the sentiment analysis module 508 can determine that the overall review score 518 was favorable or slightly favorable, and convert the favorable rating to the equivalent scale of the normalized review score 520. In another embodiment, if the customer reviews 438 are on different scales or ratings systems, the sentiment analysis module 508 can perform the statistical analysis across the customer reviews 438 by performing a similar analysis as previously mentioned with respect to converting the review score 518 but across different scales and ratings systems.

In one embodiment, once the normalized review score 520 is determined, the normalized review score 520 can be used to generate the sentiment analysis score 428. The sentiment analysis score 428 can be determined by doing a further conversion of the normalized review score 520 to the sentiment analysis score 428 scale. For example, in one embodiment, if the normalized review score 520 is on a scale from "1" to "5" and the sentiment analysis score 428 is a value in the range from "1" to "0," a conversion can be done between the two such that the normalized review score 520 can be converted to the equivalent sentiment analysis score 428. For example, if the normalized review score 520 of "5" indicates a high/favorable sentiment and the sentiment analysis score 428 of "1" indicates a high/favorable sentiment, the normalized review score of "5" can be converted or mapped to the sentiment analysis score 428 of "1" for that customer review 438.

In one embodiment, once the sentiment analysis module 508 determines the sentiment analysis score 428, the sentiment analysis module 508 can store the sentiment analysis score 428 as a value, parameter, or data, of the customer review profile 442. In one embodiment, the sentiment analysis module 508 can also generate a first instance of the customer review profile 442 in which the sentiment analysis score 428 can be stored. In one embodiment, the sentiment analysis module 508 can obtain the customer review profile 442 from another module or source, such as the first device 102, the third device 103, or an external module or device.

In one embodiment, the sentiment analysis module 508, in addition to determining the normalized review score 520, can further analyze the text of the customer review 438 to determine the sentiment, reaction, or a combination thereof of the further customer 432. The sentiment analysis module 508 can use the same methods and techniques as described with respect to FIG. 4, for example searching for and analyzing a keyword 446 to determine the sentiment, reaction, or combination thereof. In one embodiment, the sentiment analysis module 508 can combine the normalized review score 520 to any values, parameters, scores, or a combination thereof generated as a part of doing the further analysis of the text of the customer review 438 to generate the sentiment analysis score 428 and save the value in the customer review profile 442.

In one embodiment, once the sentiment analysis module 508 performs its functions by generating and storing the sentiment analysis score 428, the sentiment analysis module 508 can pass the customer review profile 442, the customer review 438 (or if multiple customer reviews the multiple customer reviews) and control to the content analysis module 510. The content analysis module 510 can enable the generation of the purchase factors 412, the preference levels 414, or a combination thereof for the customer review 438 of the further customer 432.

The content analysis module 510 can generate the purchase factors 412, the preference levels 414, or a combination thereof using the same techniques and methods as described with respect to FIG. 4, for example based on analyzing a keyword 446 to determine the purchase factors 412, the preference levels 414, or a combination thereof. In one embodiment, once the content analysis module 510 generates the purchase factors 412, the preference levels 414, or a combination thereof, the content analysis module 510 can store the purchase factors 412, the preference levels 414 as a value, parameter, data, or data structure in the customer review profile 442. In one embodiment, once the content analysis module 510 performs its functions by generating and storing the purchase factors 412, the preference levels 414, or a combination thereof, the content analysis module 510 can pass the customer review profile 442 and control to the map module 512.

The map module 512 can enable the mapping of the customer review profile 442 to the segmentation 406 in order to determine what customer group 408 the further customer 432 is most like. Because of the mapping, the system 100 can make the recommendation 434 to the further customer 432 as to whether to purchase the product 418, features 436, or a combination thereof or not. The map module 512 can perform the mapping in a similar manner as described with respect to FIG. 4, whereby the customer review profile 442 is put through the classification process 430, for example a K-Means Clustering process, such that it is mapped to a data point in an N-dimensional space, where N represents an integer. In one embodiment, once mapped, the map module 512 can pass the data point and control to the match module 514.

The match module 514 can enable the comparison of the data point generated as a result of the processes of the map module 512 to the segmentation 406 stored in the segmentation database 516. In one embodiment, the comparison can be done based on overlaying the data point with the segmentation and comparing where the data point is in comparison to the data points in the segmentation 406 representing a customer group 408. For example, in one embodiment, if an overlay is done and the data point is determined to fall in a region of the segmentation 406 representing a customer group 408, for example "CUSTOMER GROUP A," the data point representing the further customer 432 can be associated with "CUSTOMER GROUP A" and the system can associate the further customer 432 as being most like or having the same preferences as "CUSTOMER GROUP A." In one embodiment, based on the association, the system 100 can determine whether or not to make the recommendation 434. In one embodiment, the system 100 can, for example, have predetermined whether "CUSTOMER GROUP A" would likely want the product 418, features 436, or a combination thereof based on the purchasing behavior 440 of the customer group 408. As a result, the system 100 can determine that the further customer 432 if most like "CUSTOMER GROUP A" will also be likely to want the product 418, features 436, or a combination thereof, and therefore make the recommendation 434 to the further customer 436 to purchase the product 418, features 436, or a combination thereof.

In one embodiment, the recommendation 434 can be in the form of a graphic, text, visual indicator, or a combination thereof. In one embodiment, the recommendation 434 can be generated by one or more components or modules of the system 100 and can be sent to the further customer 432 via the communication path 104 for display on a display unit of one of the devices of the system 100, for example the first display interface 206 of FIG. 2, the second display interface 314 of FIG. 3, the third display interface 234 of FIGS. 2 and 3.

It has been discovered that the methods, modules, units, and components implementing the above described system 100 significantly improves the ability of computers to detect consumer attitudes and customer values from consumer online behavior or interactions because it allows computers to effectively and efficiently monitor consumer purchasing behavior 440 in real-time and determine based on the consumers writings and sentiments how the consumer feels about a product 418, features 436, further products, or a combination thereof without the need for human intervention. It has been further discovered that the system 100 significantly improves the ability of computers to make recommendations to consumers based on improving a computer's ability to detect sentiments, attitudes, reactions, or a combination thereof with a natural language machine-learning model 426 without the need for human intervention. It has been further discovered that the system 100 significantly improves a computer's ability to provide targeted and relevant recommendations to consumers such that computers and resources can be efficiently used when recommending products, reducing the need to generate unnecessary data by for example merchants when marketing or advertising products to consumers.

The system 100 has been described with module functions or order as an example. The system 100 can partition the modules differently or order the modules differently. For example, the first software 220, the second software 324, the third software 244, or a combination thereof, can include the modules for the system 100. As a specific example, the first software 220, the second software 324, the third software 244, or a combination thereof can include the segmentation module 502, the crawl module 504, the sentiment analysis module 508, the content analysis module 510, the map module 512, the match module 514, and associated sub-modules included therein.

The first control unit 210, the second control unit 238, the third control unit 318, or a combination thereof, can execute the first software 220, the second software 244, the third software 324, or a combination thereof, to operate the modules. For example, the first control unit 210, the second control unit 318, the third control unit 238, or a combination thereof, can execute the first software 220, the second software 244, the third software 324, or a combination thereof, to implement the segmentation module 502, the crawl module 504, the sentiment analysis module 508, the content analysis module 510, the map module 512, the match module 514, and associated sub-modules included therein.

Moreover, while the modules are described as being executed or implemented in or at specific stages of operation, for example, the segmentation module 502 is executed in the pre-processing state 402, while the crawl module 504, the sentiment analysis module 508, the content analysis module 510, the map module 512, the match module 514, are executed in the run-time state 404, each stage can use any of the modules used in the other stage to perform its functions or operations. For example, in order to implement its functions the system 100 at the pre-processing state 402 can implement any of the modules discussed with respect to the run-time state 404 in FIG. 5.

The modules described in this application can be implemented as instructions stored on a non-transitory computer readable medium to be executed by the first control unit 210, the second control unit 318, the third control unit 238, or a combination thereof. The non-transitory computer readable medium can include the first storage unit 216, the second storage unit 320, the third storage unit 240, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the system 100 or installed as a removable portion of the system 100.

Figure 6:
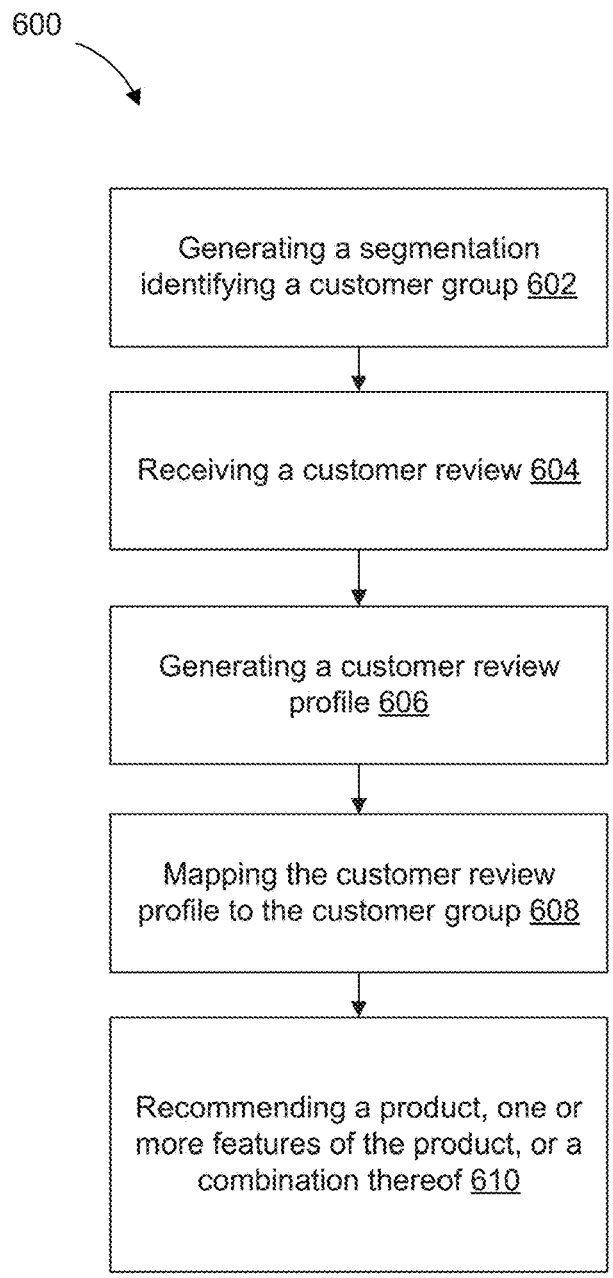
FIG. 6 is an example method of operating the recommendation engine according to an embodiment.

Referring now to FIG. 6, therein is shown an example method 600 of operating the system 100, according to an embodiment of the present disclosure. The method 600 includes: generating, by one or more computing devices, a segmentation identifying a customer group for a product, wherein the segmentation is based on one or more purchase factors and one or more preference levels associated with the purchase factors as shown in box 602; receiving, by the one or more computing devices, a customer review from a storage location, wherein the customer review is for providing an evaluation of the product or a further product as shown in box 604; generating, by the one or more computing devices, a customer review profile based on the customer review, wherein generating the customer review profile includes: generating a normalized review score for the customer review, generating a sentiment analysis score for the customer review based on the normalized review score, generating the purchase factors associated with the customer review, and generating the preference levels associated with the purchase factors as shown in box 606; matching, by the one or more computing devices, the customer review profile to the customer group based on comparing the purchase factors, the preference levels, or a combination thereof associated with the segmentation and the purchase factors, the preference levels, or a combination thereof associated with the customer review profile as shown in box 608; and recommending, by the one or more computing devices, the product, one or more features of the product, or a combination thereof to a further customer based on the matched customer review profile as shown in box 610.

In an example embodiment, the product of method 600 can be a vehicle. A vehicle refers to an automobile, e.g. truck, car, or motorcycle etc. In one embodiment, the one or more features of the vehicle can include, for example, the number of doors, the transmission, the engine size, engine type (e.g. gas or electric), the transmission type, or the interior or exterior features of the vehicle, fuel efficiency, luxury class, as examples. The aforementioned are not meant to be limiting but are illustrative of features of a vehicle. In the example embodiment, the further customer may be a user of a vehicle search platform for searching for particular vehicles that may be available in the inventory of a network of vehicle dealerships. The inventory may include hundreds of thousands of vehicles of different make, model, and year, and having a variety of features, and the recommendation of the product and/or one or more features of the product may be provided as an indication on the interface display of the search platform or as a filter for filtering the inventory, for example. In the example embodiment, and as described above, the customer review profile (which may be generated as described above based on non-vehicle related social commentary) of the further customer may be used to determine one or more recommendations for vehicles or vehicle features, thus aiding the further customer in more quickly identifying a vehicle among the vast inventory that likely matches his/her preferences.

The above detailed description and embodiments of the disclosed system 100 are not intended to be exhaustive or to limit the disclosed system 100 to the precise form disclosed above. While specific examples for the system 100 are described above for illustrative purposes, various equivalent modifications are possible within the scope of the disclosed system 100, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

The resulting method, process, apparatus, device, product, and system is cost-effective, highly versatile, and accurate, and can be implemented by adapting components for ready, efficient, and economical manufacturing, application, and utilization. Another important aspect of an embodiment of the present disclosure is that it valuably supports and services the historical trend of reducing costs, simplifying systems, and increasing performance.

These and other valuable aspects of the embodiments of the present disclosure consequently further the state of the technology to at least the next level. While the disclosed embodiments have been described as the best mode of implementing the recommendation engine, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operating a recommendation engine comprising:
   generating, by one or more computing devices, a segmentation identifying a customer group for a product, wherein the segmentation is based on one or more purchase factors and one or more preference levels associated with the purchase factors;
   receiving, by the one or more computing devices, a customer review from a storage location, wherein the customer review is for providing an evaluation of the product or a further product;
   generating, by the one or more computing devices, a customer review profile based on the customer review, wherein generating the customer review profile comprises:
      generating a normalized review score for the customer review,
      generating a sentiment analysis score for the customer review based on the normalized review score,
      generating the purchase factors associated with the customer review, and
      generating the preference levels associated with the purchase factors;
   matching, by the one or more computing devices, the customer review profile to the customer group based on comparing the purchase factors, the preference levels, or a combination thereof associated with the segmentation and the purchase factors, the preference levels, or a combination thereof associated with the customer review profile; and
   recommending, by the one or more computing devices, the product, one or more features of the product, or a combination thereof to a further customer based on the matched customer review profile.

2. The method of claim 1 wherein generating the normalized review score is based on rescaling a review score associated with the customer review.

3. The method of claim 2 wherein rescaling the review score is based on averaging the review score associated with the customer review over a threshold number of reviews.

4. The method of claim 1 wherein generating the sentiment analysis score for the customer review is based on:
   parsing a text of the customer review to find a keyword;
   associating the keyword with a sentiment category; and
   obtaining the sentiment analysis score based on counting a number of instances of the keyword in the text of the customer review.

5. The method of claim 1 wherein generating the purchase factors associated with the customer review is based on:
   parsing a text of the customer review to find a keyword; and
   associating the keyword with the purchase factors.

6. The method of claim 1 wherein generating the segmentation identifying the customer group is based on a K-Means Clustering process.

7. The method of claim 1 further comprising sending, by the one or more computing devices, for display on a display unit a recommendation for the product, the one or more features of the product, or a combination thereof.

8. A non-transitory computer readable medium including instructions for operating a recommendation engine comprising:
   generating a segmentation identifying a customer group for a product, wherein the segmentation is based on one or more purchase factors and one or more preference levels associated with the purchase factors;
   receiving a customer review from a storage location, wherein the customer review is for providing an evaluation of the product or a further product;
   generating a customer review profile based on the customer review, wherein generating the customer review profile comprises:
      generating a normalized review score for the customer review,
      generating a sentiment analysis score for the customer review based on the normalized review score,
      generating the purchase factors associated with the customer review, and
      generating the preference levels associated with the purchase factors;
   matching the customer review profile to the customer group based on comparing the purchase factors, the preference levels, or a combination thereof associated with the segmentation and the purchase factors, the preference levels, or a combination thereof associated with the customer review profile; and
   recommending the product, one or more features of the product, or a combination thereof to a further customer based on the matched customer review profile.

9. The non-transitory computer readable medium of claim 8 with instructions wherein generating the normalized review score is based on rescaling a review score associated with the customer review.

10. The non-transitory computer readable medium of claim 9 with instructions wherein rescaling the review score is based on averaging the review score associated with the customer review over a threshold number of reviews.

11. The non-transitory computer readable medium of claim 8 with instructions wherein generating the sentiment analysis score for the customer review is based on:
   parsing a text of the customer review to find a keyword;

associating the keyword with a sentiment category; and obtaining the sentiment analysis score based on counting a number of instances of the keyword in the text of the customer review.

12. The non-transitory computer readable medium of claim 8 with instructions wherein generating the purchase factors associated with the customer review is based on:

parsing a text of the customer review to find a keyword; and associating the keyword with the purchase factors.

13. The non-transitory computer readable medium of claim 8 with instructions wherein generating the segmentation identifying the customer group is based on a K-Means Clustering process.

14. The non-transitory computer readable medium of claim 8 with instructions further comprising sending, by the one or more computing devices, for display on a display unit a recommendation for the product, the one or more features of the product, or a combination thereof.

15. A recommendation engine comprising:

a control unit configured to:

generate a segmentation identifying a customer group for a product, wherein the segmentation is based on one or more purchase factors and one or more preference levels associated with the purchase factors;

generate a customer review profile based on a customer review received from a storage location, wherein the customer review is for providing an evaluation of the product or a further product, and wherein generating the customer review profile comprises:

generating a normalized review score for the customer review, generating a sentiment analysis score for the customer review based on the normalized review score, generating the purchase factors associated with the customer review, and generating the preference levels associated with the purchase factors;

match the customer review profile to the customer group based on comparing the purchase factors, the preference levels, or a combination thereof associated with the segmentation and the purchase factors, the preference levels, or a combination thereof associated with the customer review profile; and recommend the product, one or more features of the product, or a combination thereof to a customer based on the matched customer review profile; and a communication unit, coupled to the control unit, configured to:

receive the customer review from the storage location, and send for display on a display unit a recommendation for the product, the one or more features of the product, or a combination thereof.

16. The recommendation engine of claim 15 wherein the control unit is configured to generate the normalized review score based on rescaling a review score associated with the customer review.

17. The recommendation engine of claim 16 wherein the control unit is configured to rescale the review score based on averaging the review score associated with the customer review over a threshold number of reviews.

18. The recommendation engine of claim 15 wherein the control unit is configured to generate the sentiment analysis score for the customer review based on:

parsing a text of the customer review to find a keyword;

associating the keyword with a sentiment category; and obtaining the sentiment analysis score based on counting a number of instances of the keyword in the text of the customer review.

19. The recommendation engine of claim 15 wherein the control unit is configured to generate the list of the purchase factors associated with the customer review based on:

parsing a text of the customer review to find a keyword; and associating the keyword with the purchase factors.

20. The recommendation engine of claim 15 wherein the control unit configured to generate the segmentation identifying the customer group based on a K-Means Clustering process.

* * * * *